(12) United States Patent
Hung

(10) Patent No.: US 6,582,088 B2
(45) Date of Patent: Jun. 24, 2003

(54) OPTICAL PATH FOLDING APPARATUS

(75) Inventor: Tsan-Yao Hung, Tainan Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/897,641

(22) Filed: Jun. 29, 2001

(65) Prior Publication Data

US 2002/0018310 A1 Feb. 14, 2002

(30) Foreign Application Priority Data

Aug. 10, 2000 (TW) ........................................ 89116084 A

(51) Int. Cl.⁷ ................................................ G02B 5/08
(52) U.S. Cl. ...................................... 359/861; 359/850
(58) Field of Search ................................. 359/726, 850, 359/857, 861, 862

(56) References Cited

U.S. PATENT DOCUMENTS

| | | | | |
|---|---|---|---|---|
| 4,487,478 A | * | 12/1984 | Jackson | 356/519 |
| 5,042,931 A | * | 8/1991 | Mourier | 359/618 |
| 5,220,463 A | * | 6/1993 | Edelstein et al. | 359/857 |
| 5,923,474 A | * | 7/1999 | Mou | 359/618 |
| 6,144,475 A | * | 11/2000 | Sheng | 355/66 |
| 6,211,988 B1 | * | 4/2001 | Engelhardt et al. | 359/201 |

* cited by examiner

*Primary Examiner*—Mark A. Robinson
(74) *Attorney, Agent, or Firm*—Ladas & Parry

(57) ABSTRACT

An optical path folding apparatus of the present invention receives an incident light and reflects a reflection light on a lens set. The optical path folding apparatus comprises a first portion receiving the incident light and reflecting a first light beam, a second portion receiving the first light beam and reflecting a second light beam, a third portion receiving the second light beam and reflecting a third light beam, a fourth portion receiving the third light beam and reflecting a fourth light beam, a fifth portion receiving the fourth light beam and reflecting a fifth light beam, and a sixth portion receiving the fifth light beam and reflecting a reflection light on the lens set. In a preferred embodiment, the first portion and the fifth portion are coplanar on a first mirror, while the second portion, the fourth portion and the sixth portion are coplanar on a second mirror. Light reflected from a scanned object forms an image on the CCD by means of the lens set, wherein the light is reflected six times by the optical path folding apparatus.

6 Claims, 20 Drawing Sheets

OPTICAL PATH FOLDING APPARATUS

BACKGROUND OF THE INVENTION

1. Field of the Invention

The present invention relates to an optical path folding apparatus for application to a scanner. In particular, the present invention relates to an optical path folding apparatus providing a longer optical path within the limited confines of a scanner body.

2. Description of the Prior Art

Conventional scanners use mirrors to fold an optical path one or more times, thereby reducing the dimensions of the scanner. A mirror may be used to provide light reflections, in which case the mirror is said to fold the optical path. The mirrors ultimately direct light reflected or emitted by an object to a lens set, and the lens set collects the light and projects the resulting image onto an image capturing device, for example a charge coupled device (CCD). The CCD converts the image into a digital signal for computer processing and storage.

A long optical path is desirable in order to minimize spherical aberration. However, the long optical path must conform to the desired dimensions of the scanner. The number, size, and positioning of the mirrors directly affect the size of an optical path folding apparatus, and therefore also affect the size, weight, and cost of a scanner.

The optical path of a conventional scanner may have four mirrors as shown in FIG. 1. Each mirror provides one reflection. A scanner with such an optical path folding apparatus has a feature of large volume, heavy weight and high production cost.

FIG. 2 shows another type of optical path found in conventional scanners, which employ one or more mirrors for the purpose of folding the optical path into a relatively compact configuration. Mirror M1 in FIG. 2 is a folding mirror which produces a relatively compact optical path configuration by folding a portion of the optical path into alignment with the final ray of the optical path. Additional folding mirrors may be used to further reduce the size of the optical path.

FIG. 3A shows a third type of optical path apparatus used in conventional scanners. The optical path includes multiple reflections between a pair of parallel flat mirrors, followed by a single reflection on a third mirror that directs light rays to the lens set. The use of multiple reflections between parallel mirrors can achieve a long optical path; however, it also could lead to the phenomena of "ghost images". As shown in FIG. 3B and FIG. 3C, aberrant light rays outside the desired optical path still reach the lens set and image capturing device, and thus make the captured image overlapped. A so-called "ghost images" is thus produced and thereby decreases the quality of the captured image.

SUMMARY OF THE INVENTION

An object of the present invention is to solve the above-mentioned problems of the prior art by providing an optical path folding apparatus with a long optical path that does not suffer from the phenomena of ghost images.

In accordance with the object of the present invention, the optical path folding apparatus suitable for reflecting an incident light beam onto a lens set comprises a first reflection portion, a second reflection portion, a third reflection portion, a fourth reflection, a fifth reflection, and a sixth reflection portion. The first reflection portion receives the incident light beam and reflects a first light beam. The second reflection portion receives the first light beam and reflects a second light beam. The third reflection portion receives the second light beam and reflects a third light beam. The fourth reflection portion receives the third light beam and reflects a fourth light beam. The fifth reflection portion receives the fourth light beam and reflects a fifth light beam. The sixth reflection portion reflects the fifth light beam onto a lens set. The first reflection portion and the fifth reflection portion are coplanarity and can be located on a first mirror. The second reflection portion, fourth reflection portion and sixth reflection portion are coplanar and can be located on a second mirror.

In the optical folding apparatus of the present invention, light is reflected six times. Thus, a relatively long optical path can be obtained even when the optical apparatus is disposed in a confined space. Furthermore, the fact that the plane comprising first and fifth portions and the plane comprising the second, fourth and sixth portions are not parallel, the angle of reflection at successive reflection portions is not the same. Therefore, aberrant light rays outside the desired optical path will not reach the lens set and image capturing device. Thus, the present invention eliminates ghost images caused by optical folding apparatus using parallel mirrors.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
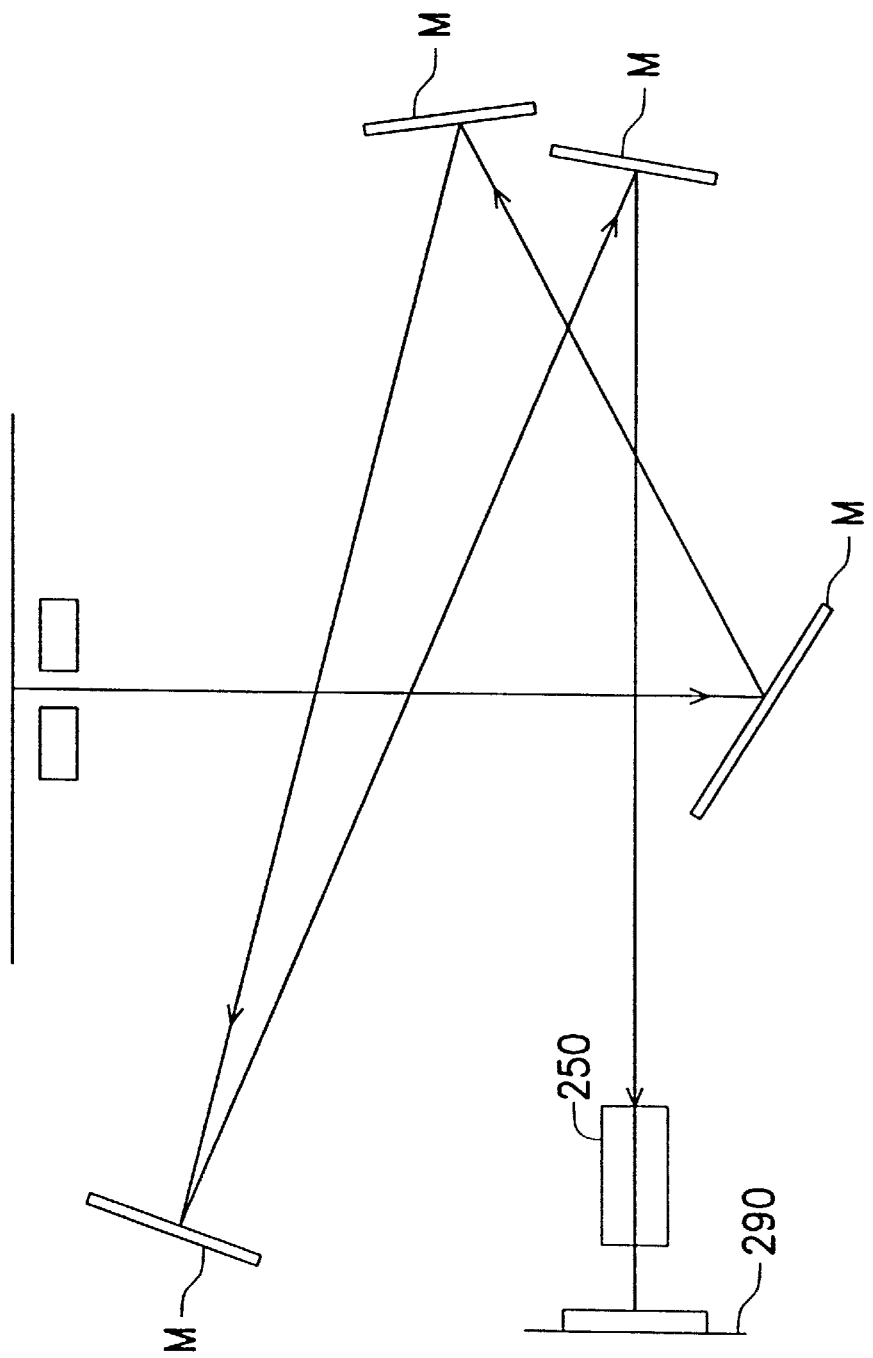
FIG. 1 is a schematic view of a conventional optical path folding apparatus having four mirrors.
Figure 2:
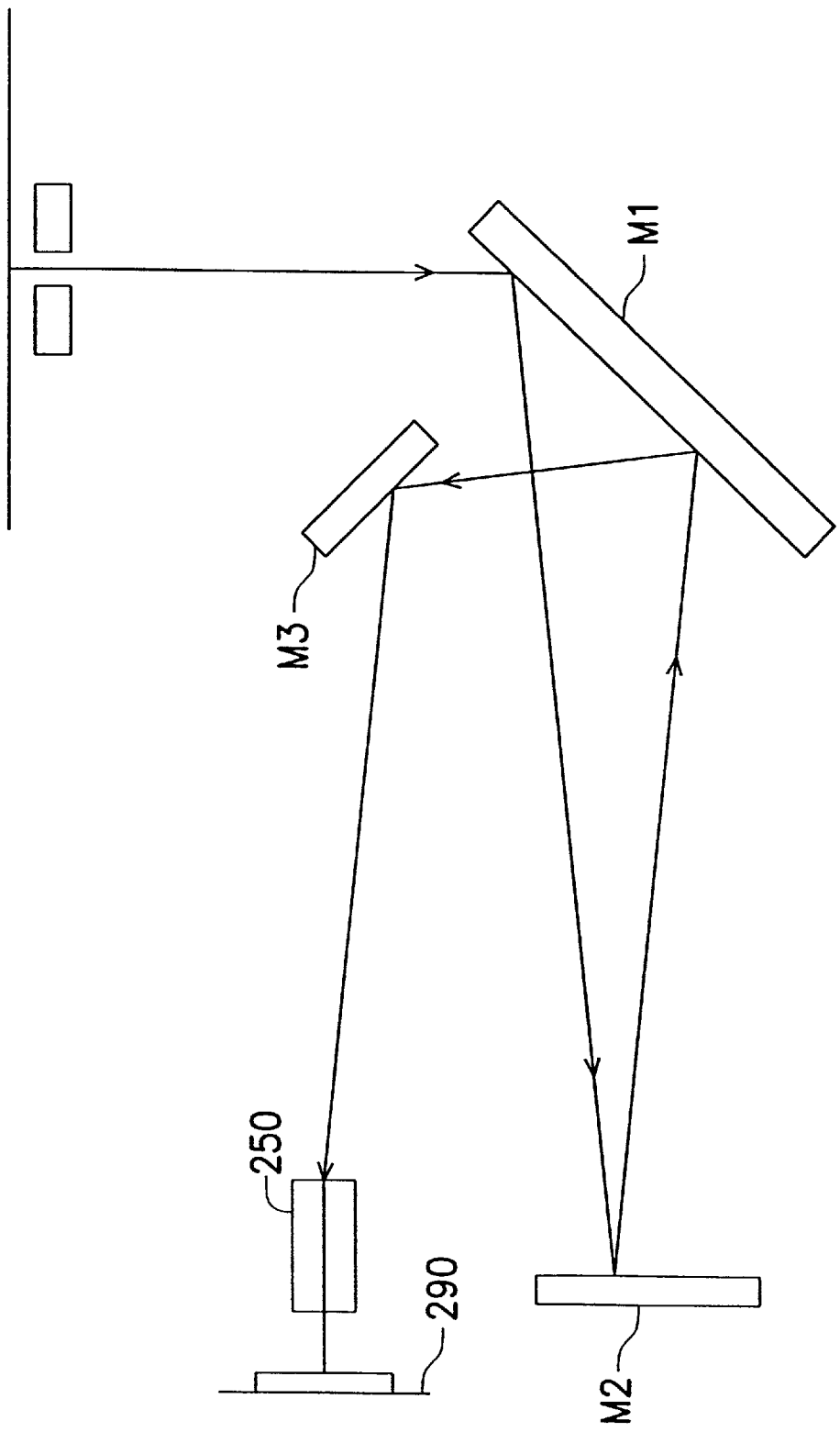
FIG. 2 is a schematic view of an optical path folding apparatus having three mirrors.
Figure 3A:
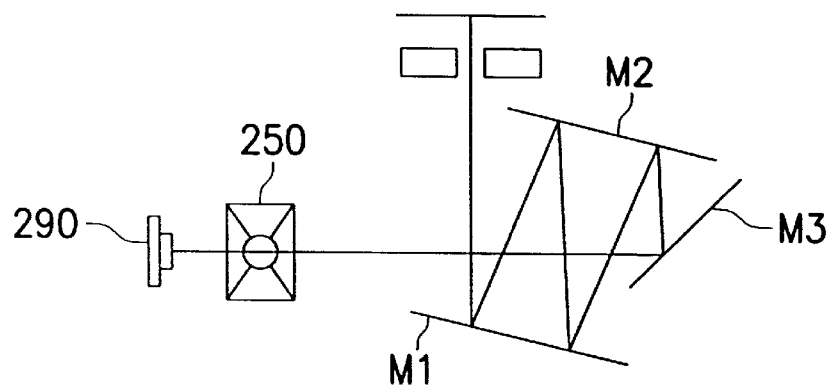
FIG. 3A is a schematic view of an optical path folding apparatus having three mirrors, two of which are parallel.
Figure 3B:
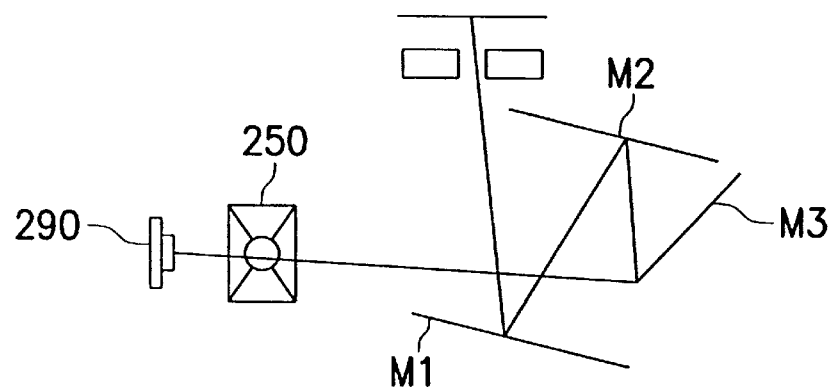
FIG. 3B and FIG. 3C shows how a ghost image can result from the conventional optical path folding of FIG. 3A.
Figure 3C:
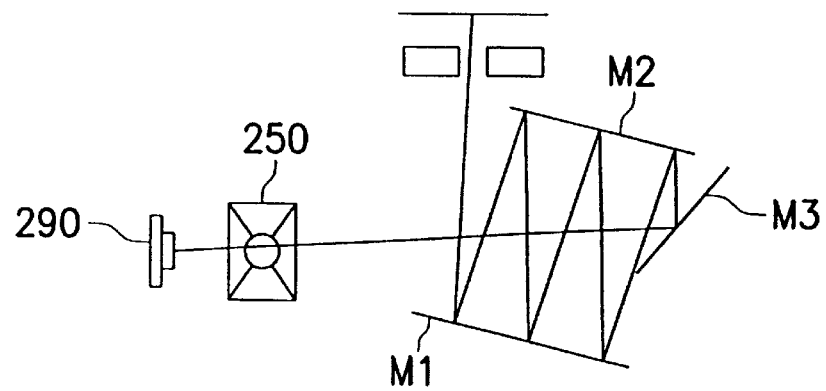
Figure 4:
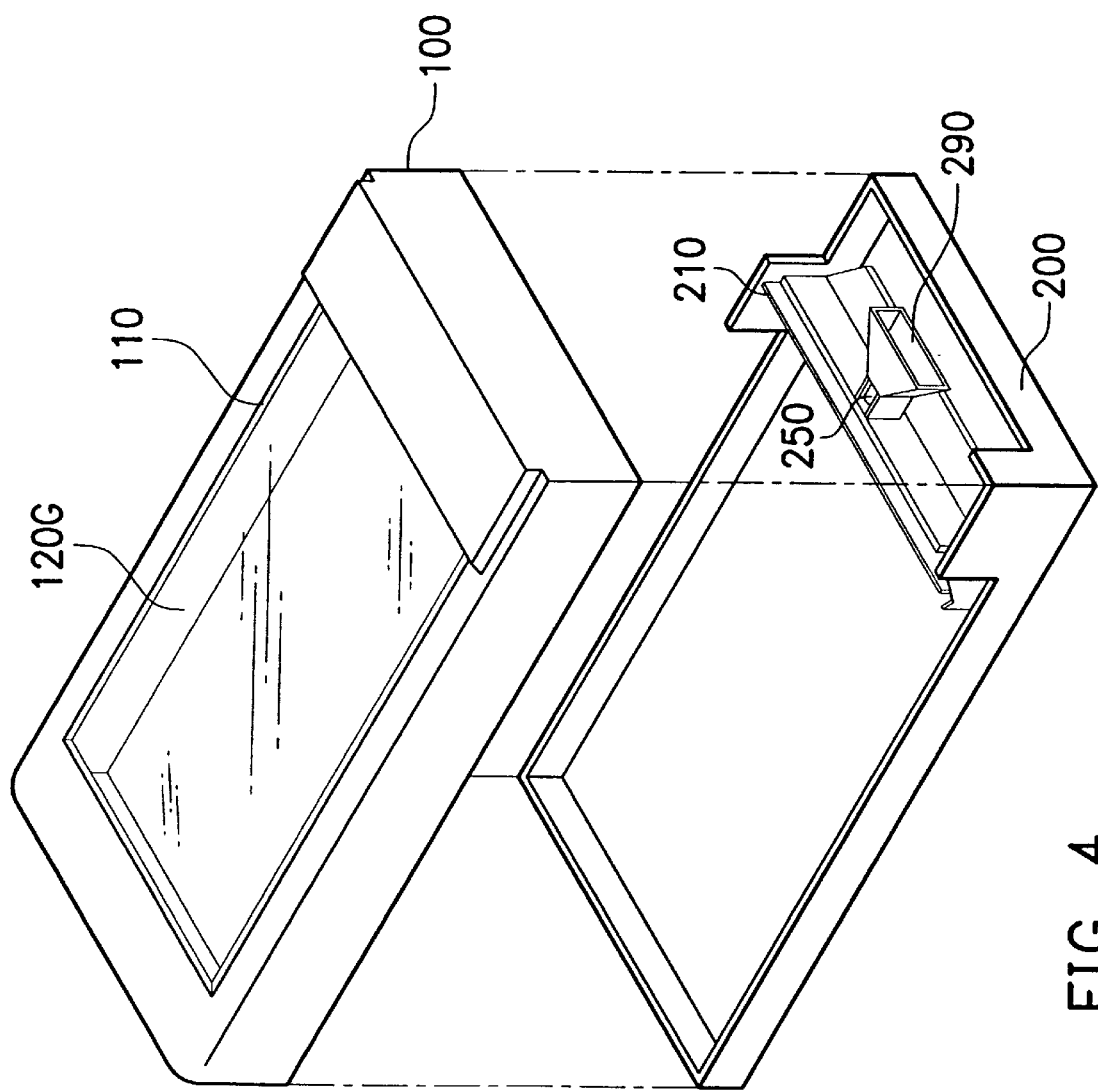
FIG. 4 is an exploded 3D view of a scanner of the preferred embodiment of the present invention.

FIG. 4 is an exploded 3D view of a scanner of the preferred embodiment of the present invention. As shown in FIG. 4, the scanner of the preferred embodiment of the present invention comprises: a first casing 100, a transparent plate 120G, a light source (not shown), an optical path folding apparatus 210, a lens set 250, an image reader 290, and a second casing 200.

The first casing 100 has an opening 110. The transparent plate 120G is fixed in the opening 110 of the first casing 100. During operation of the scanner, a scanned object (not shown) is positioned on the top surface of the transparent plate 120G. A light source (not shown) provides illumination on the scanned object.

The optical path folding apparatus 210 is disposed in the bottom casing 200. In the preferred embodiment, the invention is composed of three particularly positioned mirrors. In the case of a reflective type scanner, an incident light reflected by the scanned object is guided in the optical path folding apparatus 210. After six reflections in the apparatus 210 as described below, the incident light is directed to enter a lens set 250. The light beam is then projected onto an image reader 290, whereby light image formed by the lens set 250 is converted to digital signal for storing and processing by a computer. The image reader 290 can be, for example, a charged coupled device (CCD).

First Embodiment

Figure 5:
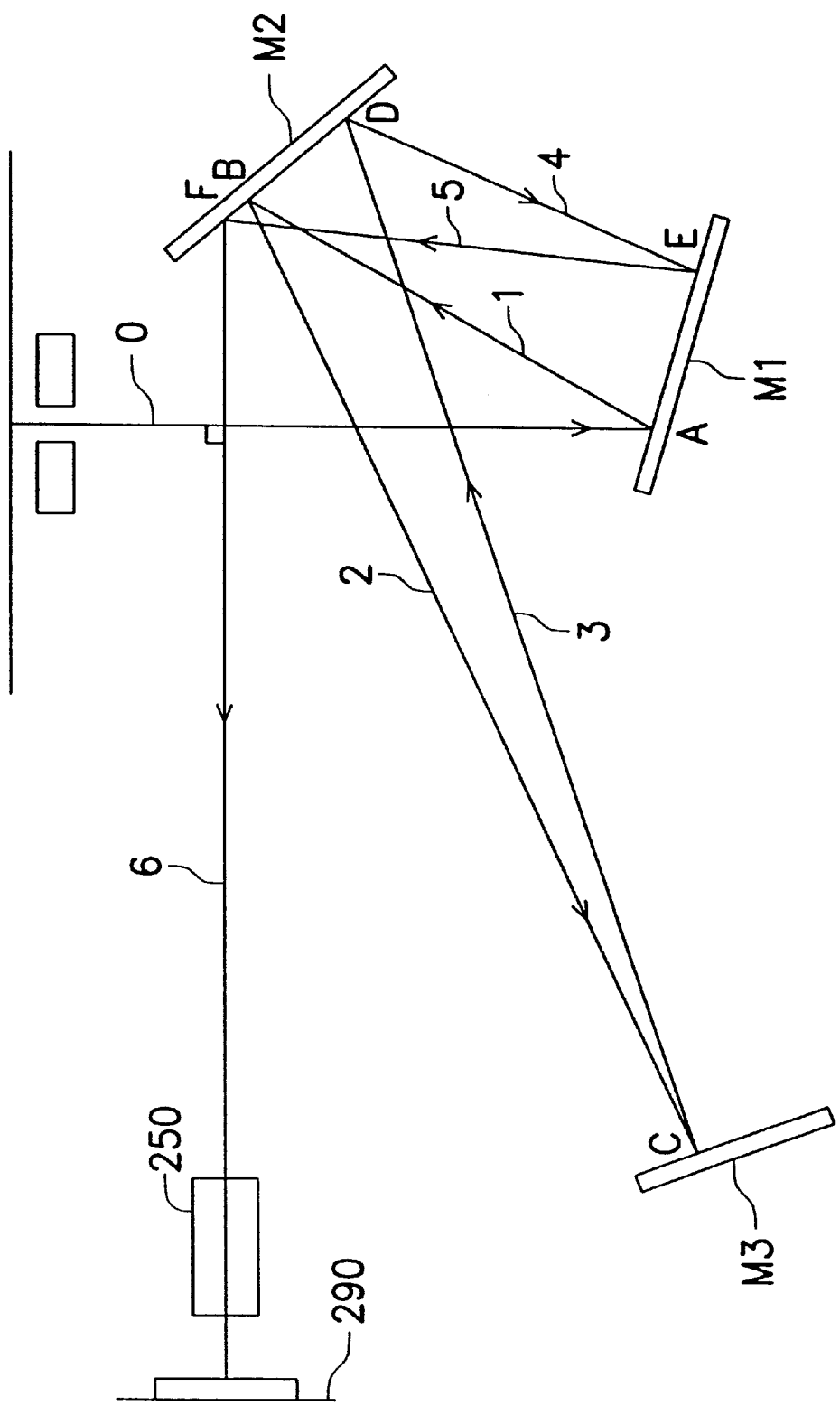
FIG. 5 is a schematic view of an optical path folding apparatus of the first embodiment of the present invention.
Figure 6A:
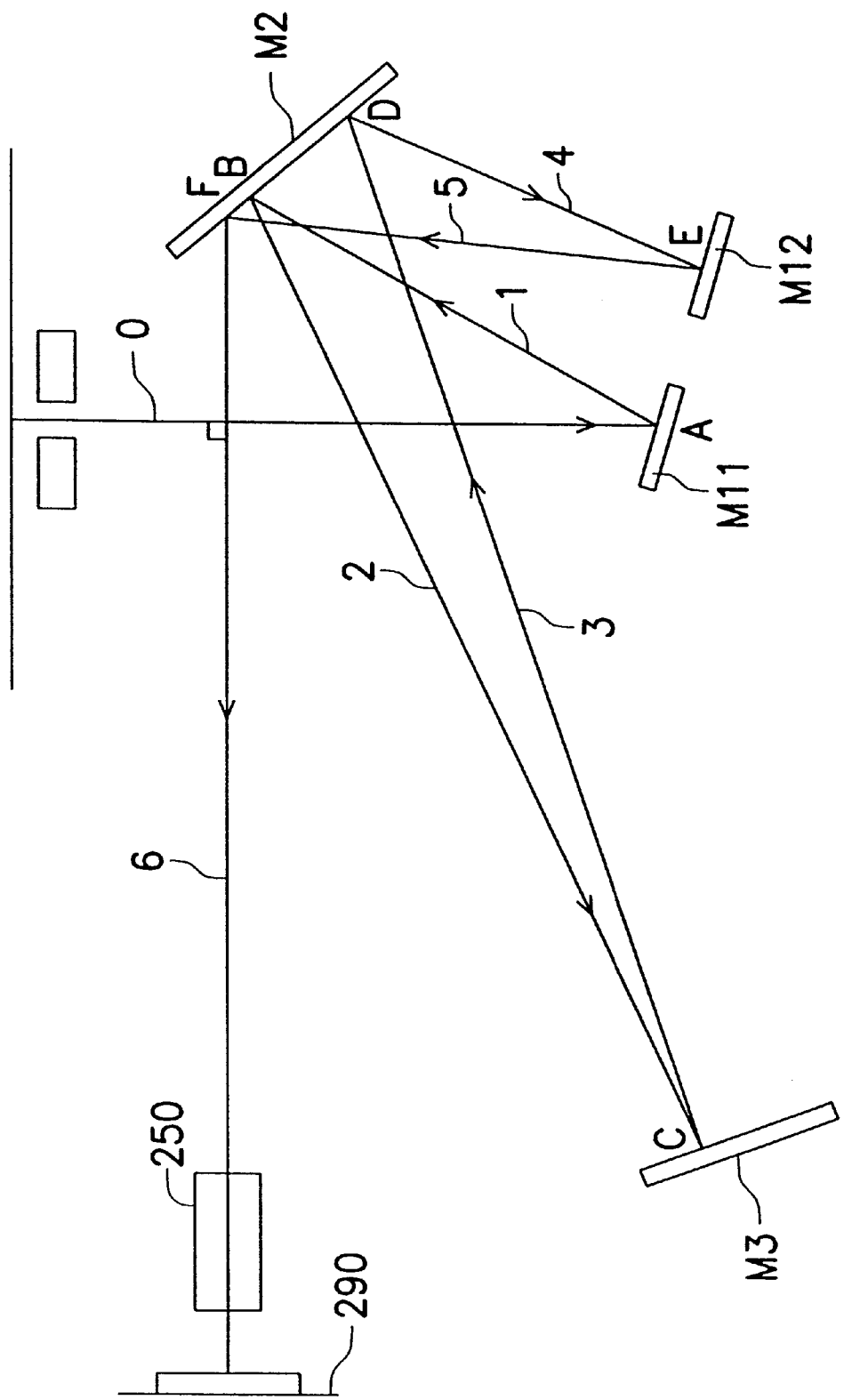
FIG. 6A to FIG. 6G show alternate structures of the first embodiment of the present invention.
Figure 6B:
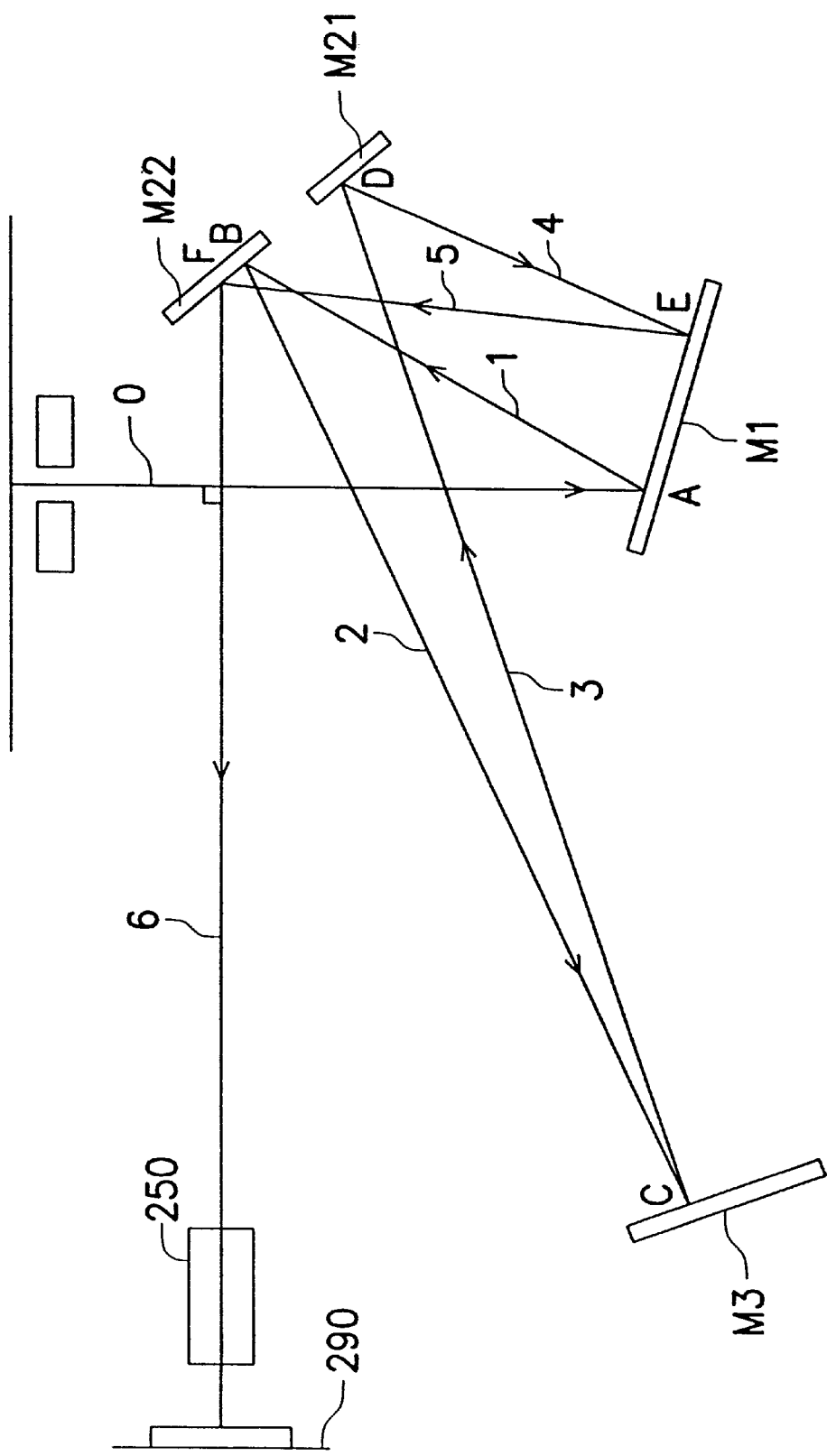
Figure 6C:
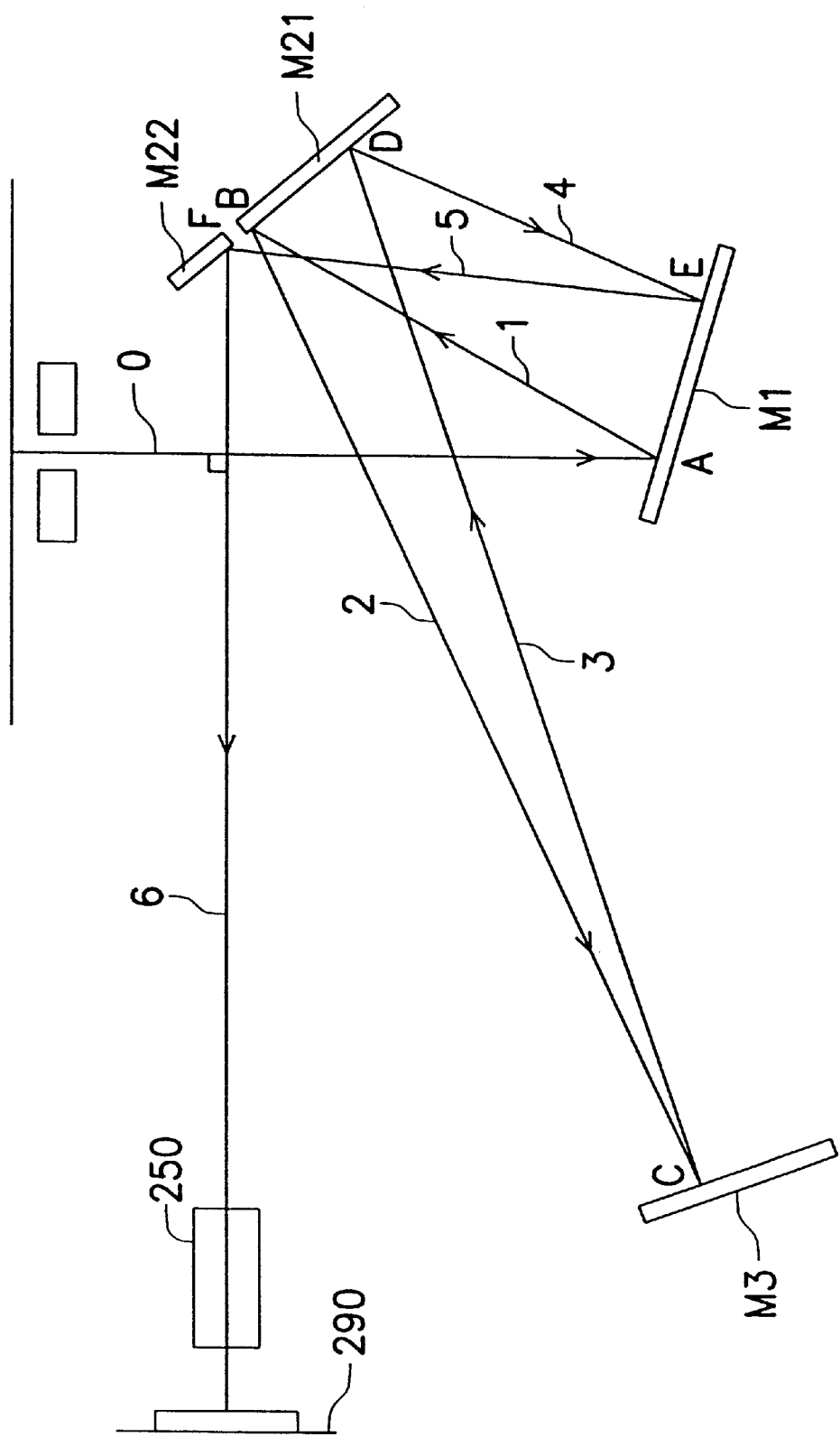
Figure 6D:
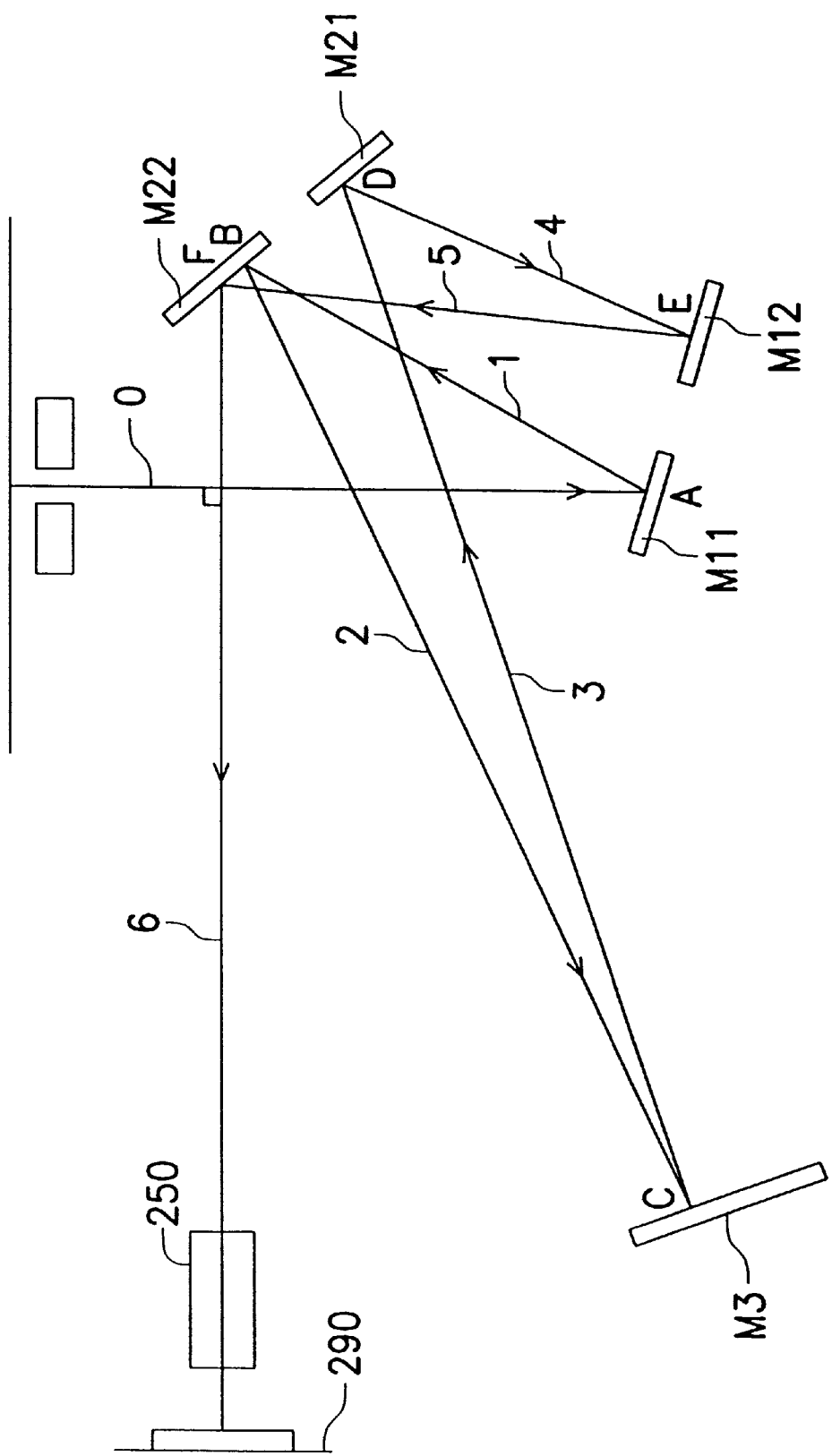
Figure 6E:
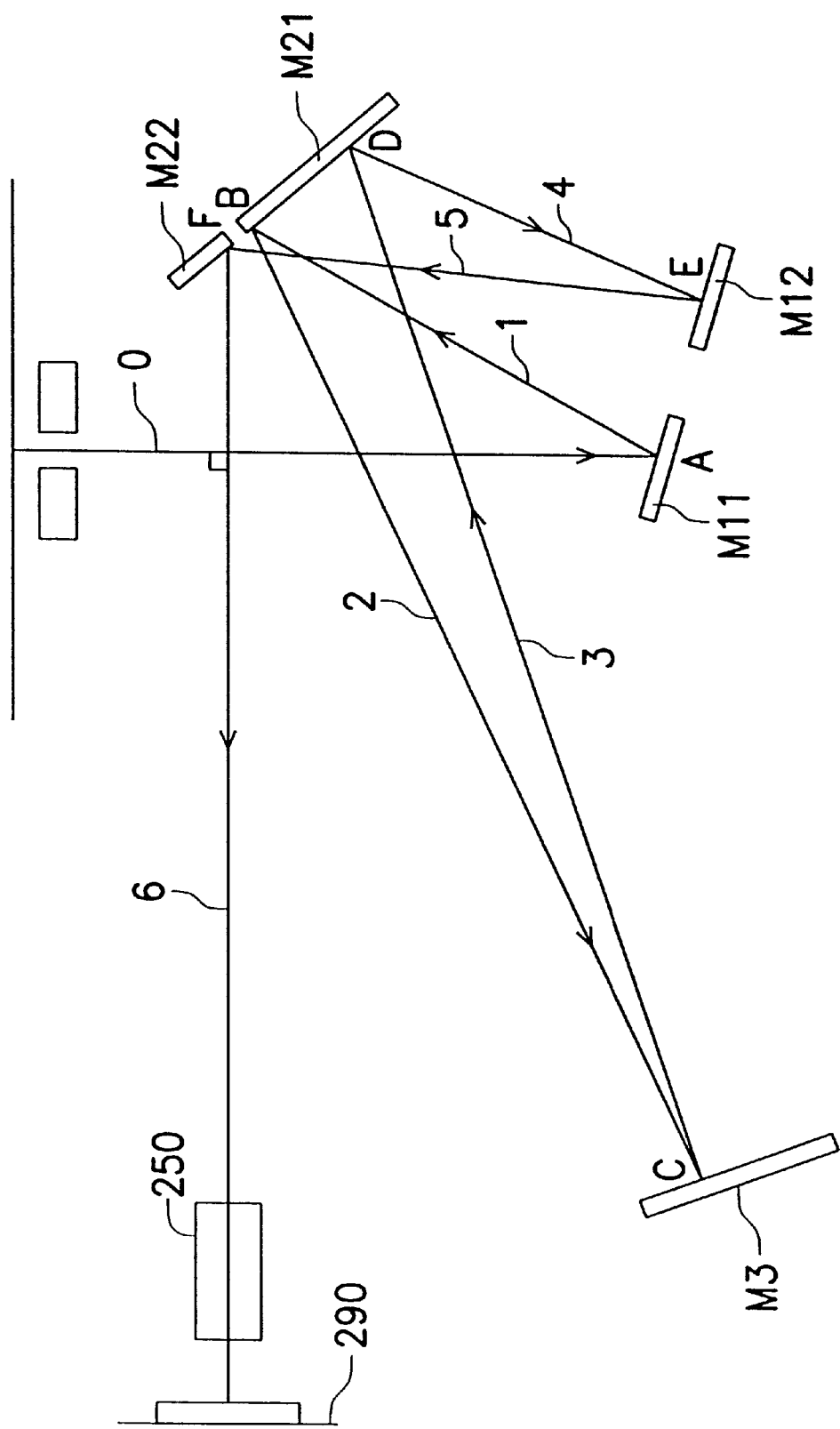
Figure 6F:
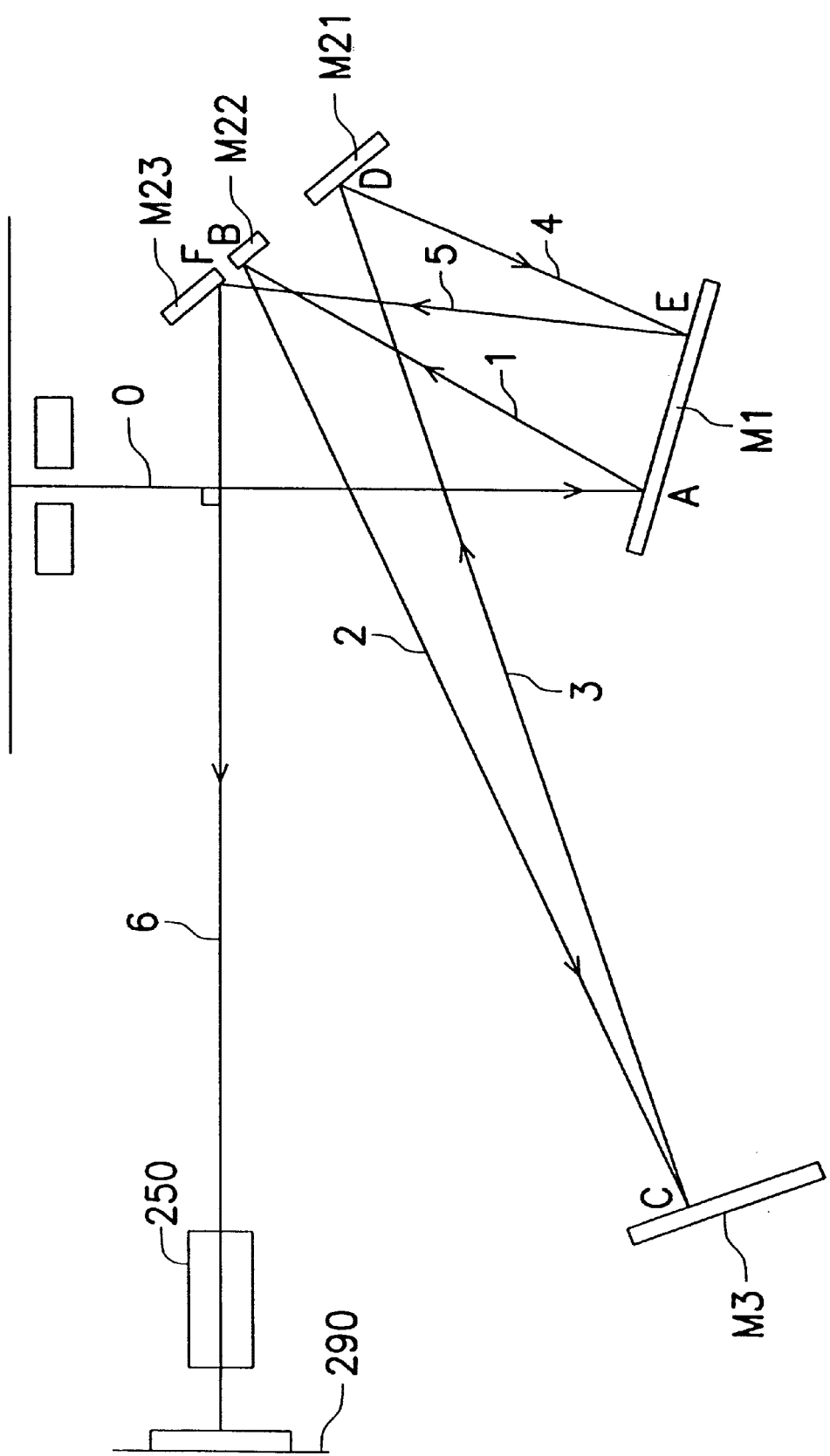
Figure 6G:
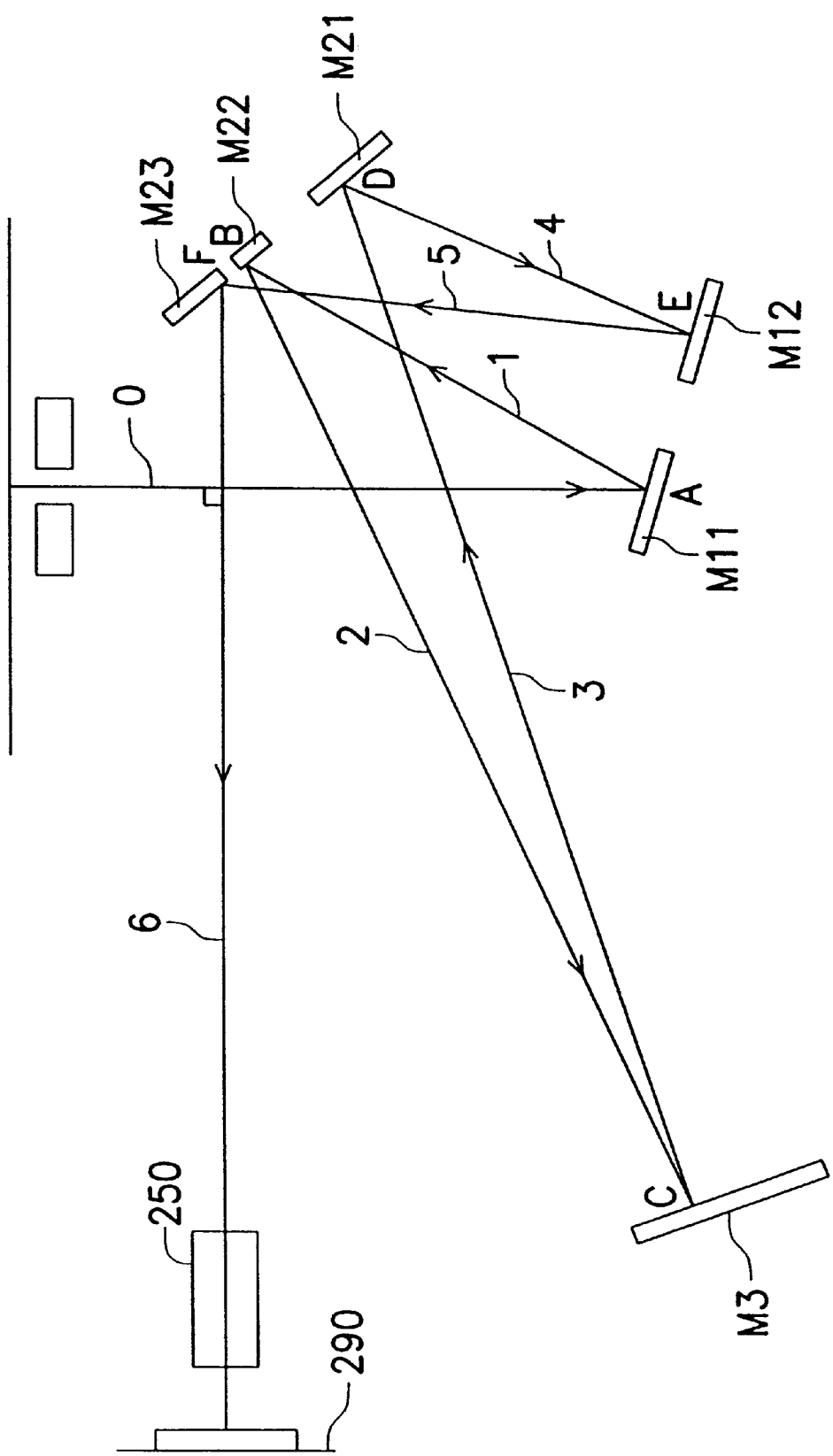

FIG. 5 is a schematic view of an optical path folding apparatus of a first embodiment of the present invention. As shown in FIG. 5, the optical path folding apparatus comprises a first mirror M1, a second mirror M2 and a third mirror M3, and all the mirrors constructs in respective positions and appropriate angles. In the first embodiment of the present invention, the light beam emitted from a light source is reflected by a scanned object and then enters an optical path folding apparatus. A reflecting sequence of the light beams in the optical path folding apparatus is →M1→M2→M3→M2→M1→M2→the lens set. The first mirror M1 has two coplanar reflection portions A and E, wherein the light reflected at each portion is reflected at a different angle. The second mirror M2 has three coplanar reflection portions B, D and F at different positions, wherein the light reflected at each portion is reflected at a different angle. The third mirror M3 has one reflection portion C. Thus, the light is reflected six times.

The sequence of the reflection is now described. As shown in FIG. 5, a first portion A of the first mirror M1 receives an incident light beam 0 and reflects a first light beam 1 to illuminate on a second portion B of the second mirror M2. Next, the second portion B of the second mirror M2 receives the first light beam 1 and reflects a second light beam 2 to illuminate on a third portion C of the third mirror M3. Next, the third portion C of the third mirror M3 receives the second light beam 2 and reflects a third light beam 3 to illuminate on a fourth portion D of the second mirror M2. Next, the fourth portion D of the second mirror M2 receives the third light beam 3 and reflects a fourth light beam 4 to illuminate on a fifth portion E of the first mirror M1. Next, the fifth portion E of the first mirror M1 receives the fourth light beam 4 and reflects a fifth light beam 5 to illuminate on a sixth portion F of the second mirror M2. Finally, the sixth portion F of the second mirror M2 receives the fifth light beam 5 and reflects a sixth light beam 6 leaving the optical path folding apparatus. In this embodiment, the mirrors are accordingly positioned such that the incident light beam 0 is exactly perpendicular to the sixth light beam 6.

The light beam emerging from the optical path folding apparatus then enters a lens set 250. If the light beam is deflected due to misalignment of the mirrors and does not enter the lens set at the optimal position, it is easy to adjust the third mirror M3 to correctly guide the light beam into the lens set 250. Because the third mirror M3 has only one reflection portion, adjusting the third mirror M3 for guiding the light beam into the lens set 250 is easier than adjusting the others. Finally, the image of a scanned object is projected onto the CCD of the image reader 290 by the lens set 250.

FIG. 6A to FIG. 6G shows alternate views of the first embodiment of the present invention. It is not necessary for the first portion A and the fifth portion E being on the same mirror. Nor is it necessary for the second portion B, the fourth portion D and the sixth portion F being on the same mirror. The mirrors may be divided into pieces as long as the portions for reflecting light beams are still coplanar. That is, the first portion A and the fifth portion E should remain coplanar, and the second portion B, the fourth portion D and the sixth portion F should remain coplanar.

Second Embodiment

Figure 7:
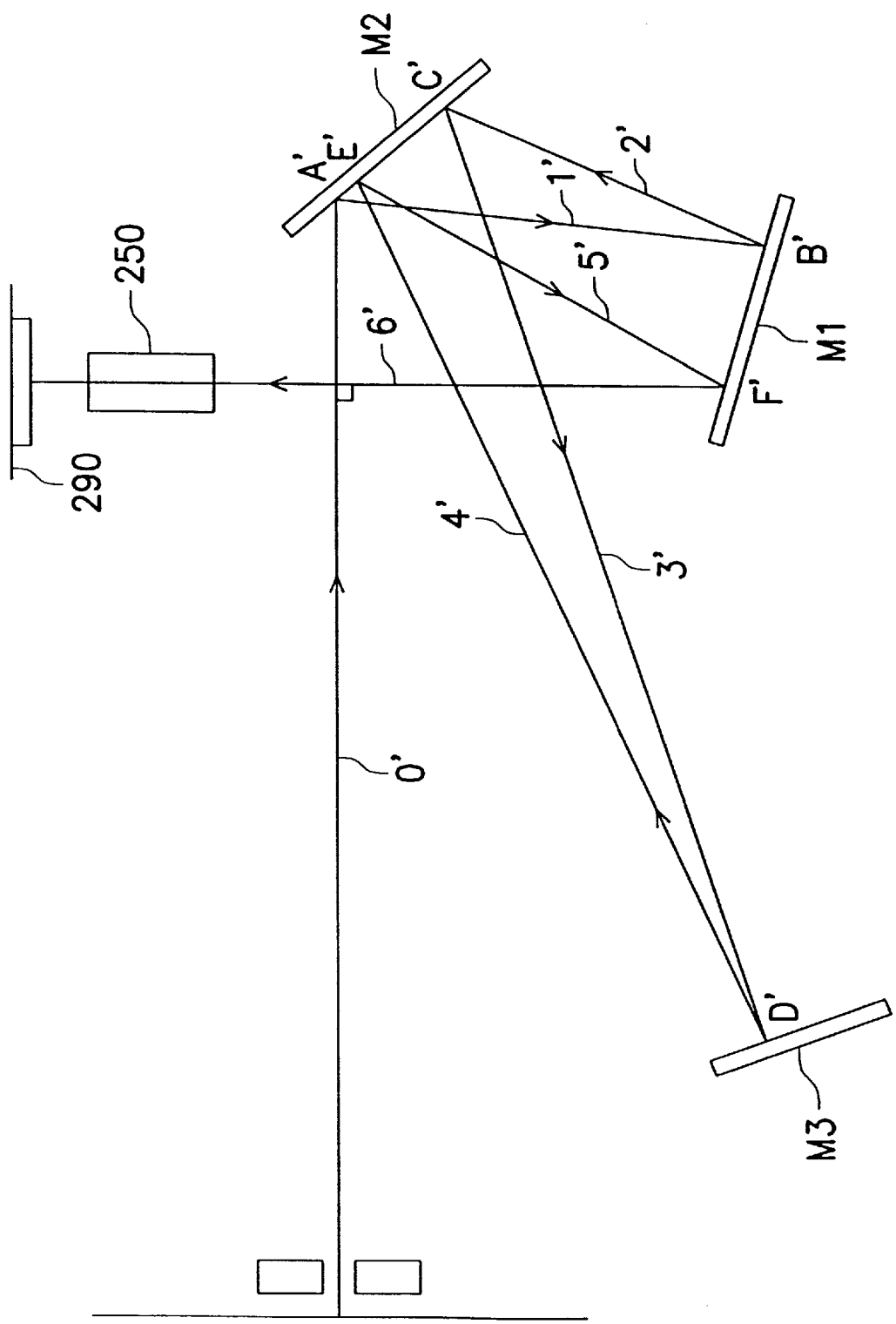
FIG. 7 is a schematic view of an optical path folding apparatus of the second embodiment of the present invention.
Figure 8A:
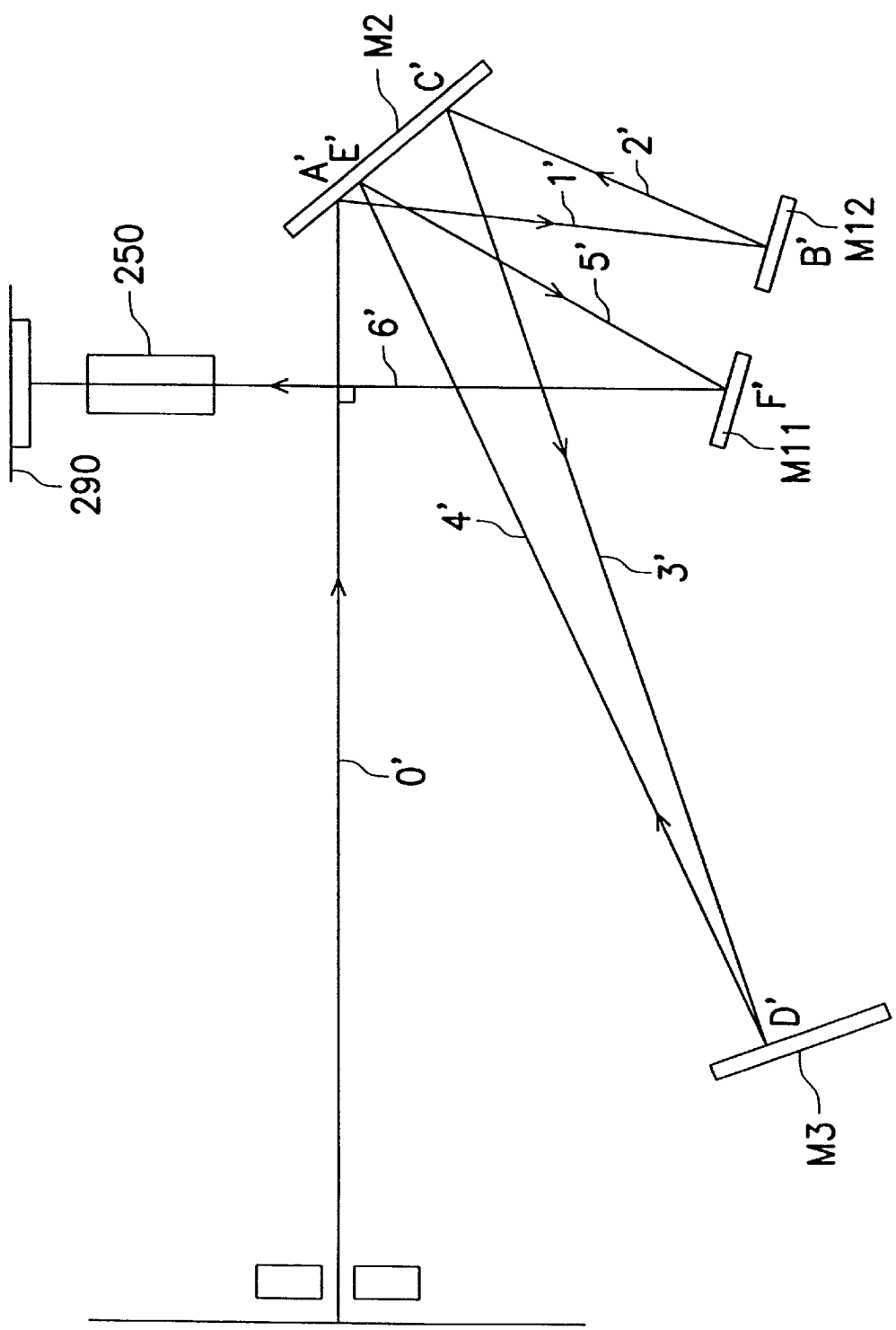
FIG. 8A to FIG. 8G shows alternate structures of the second embodiment of the present invention.
Figure 8B:
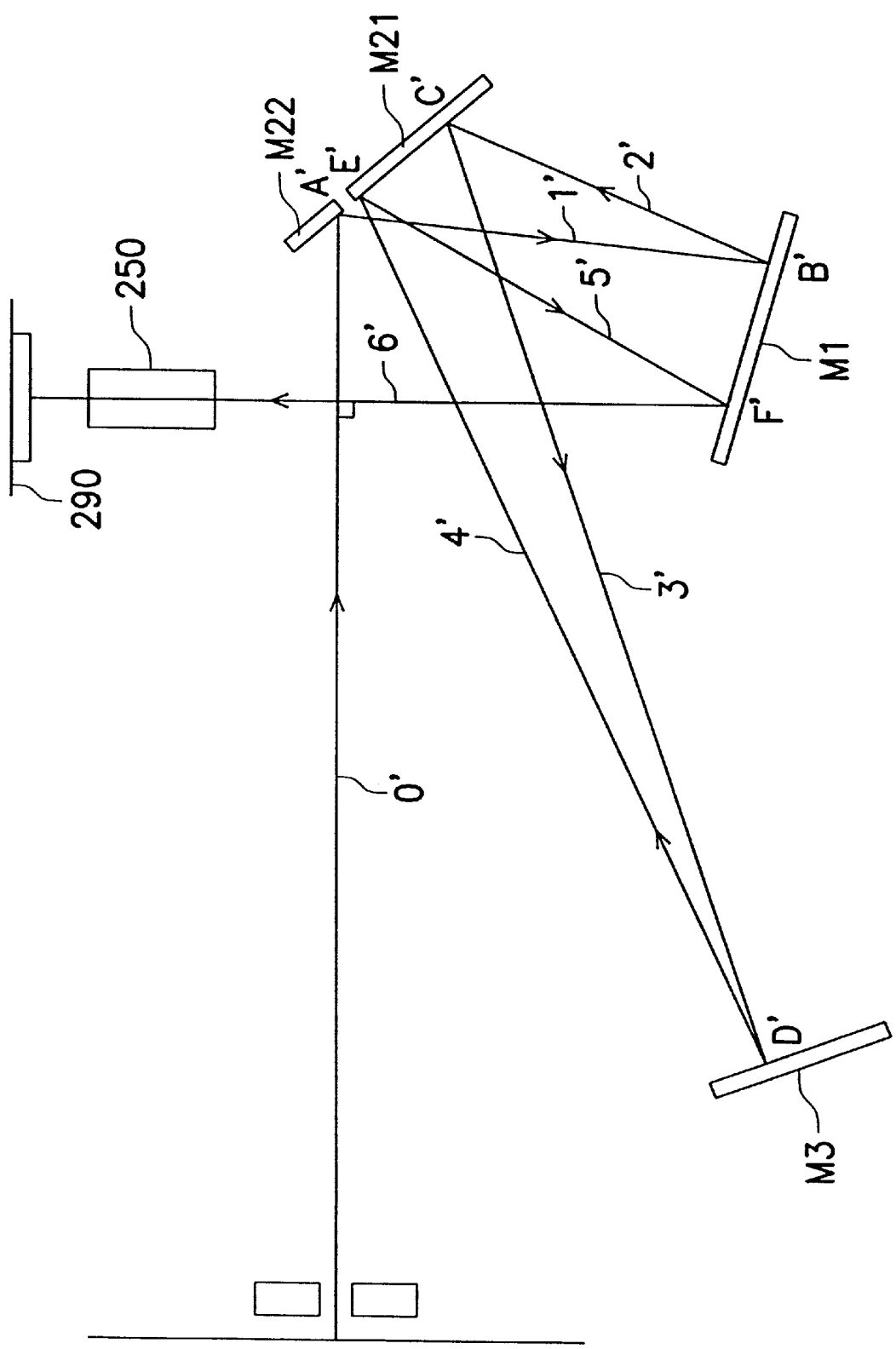
Figure 8C:
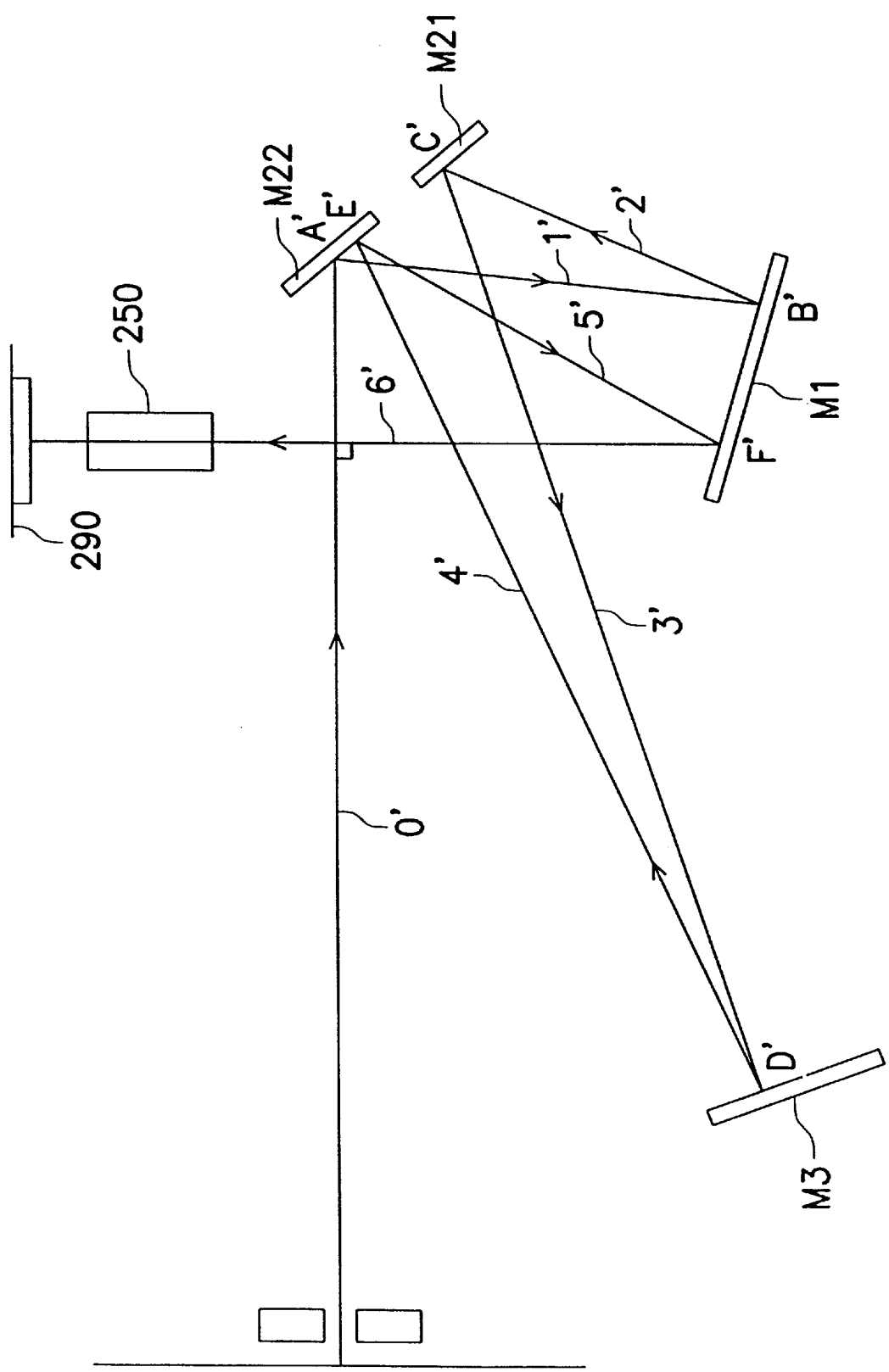
Figure 8D:
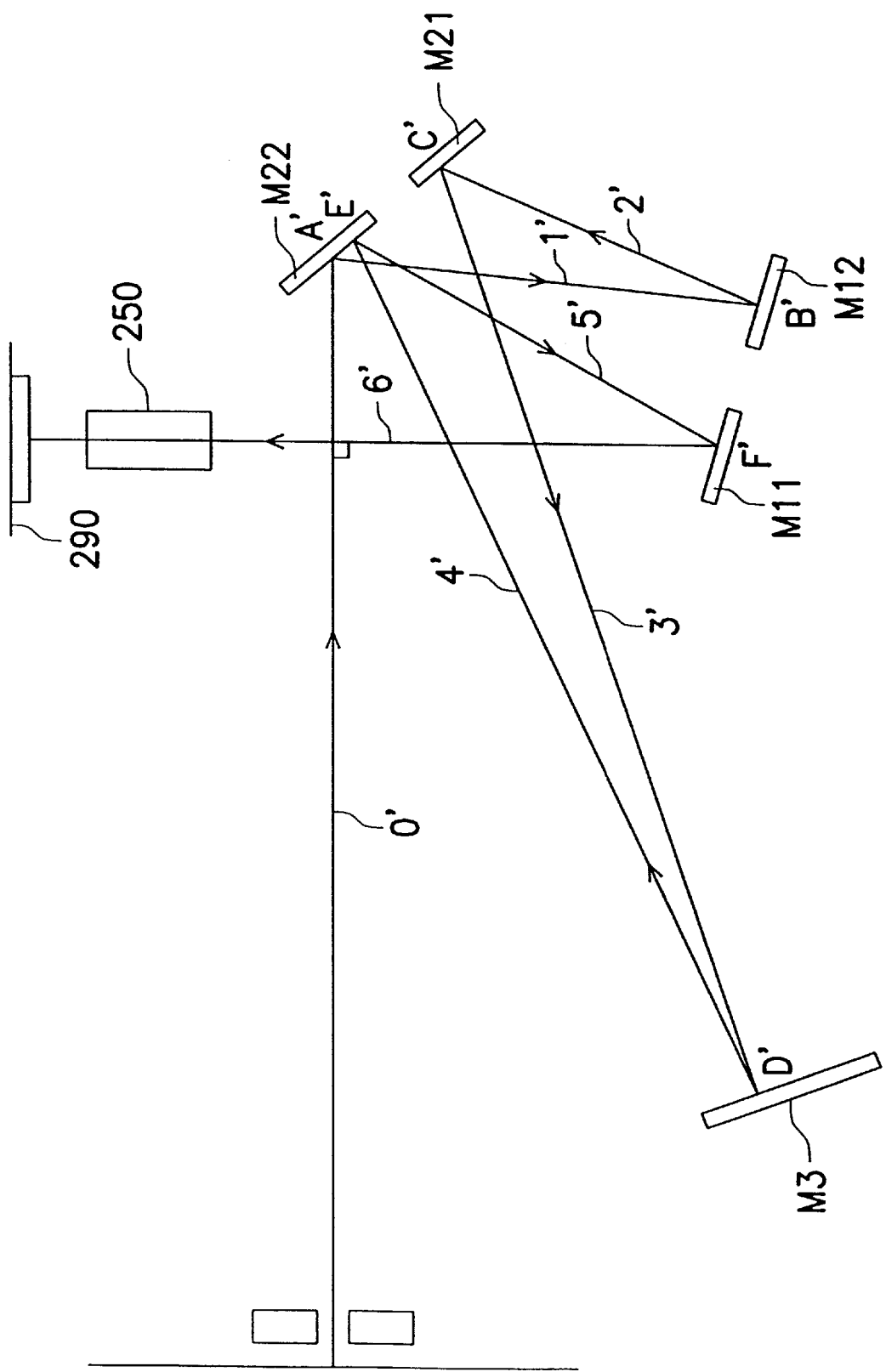
Figure 8E:
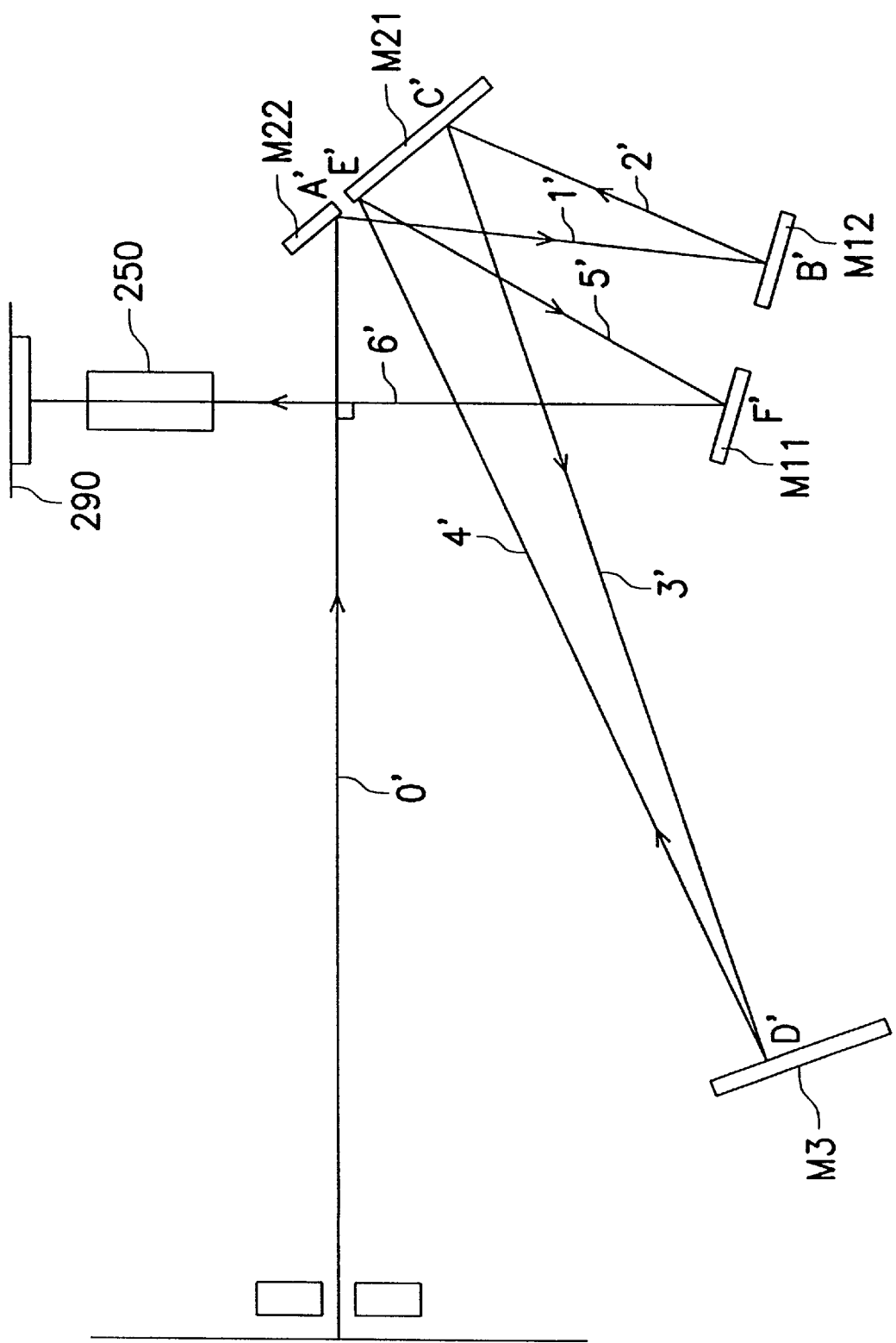
Figure 8F:
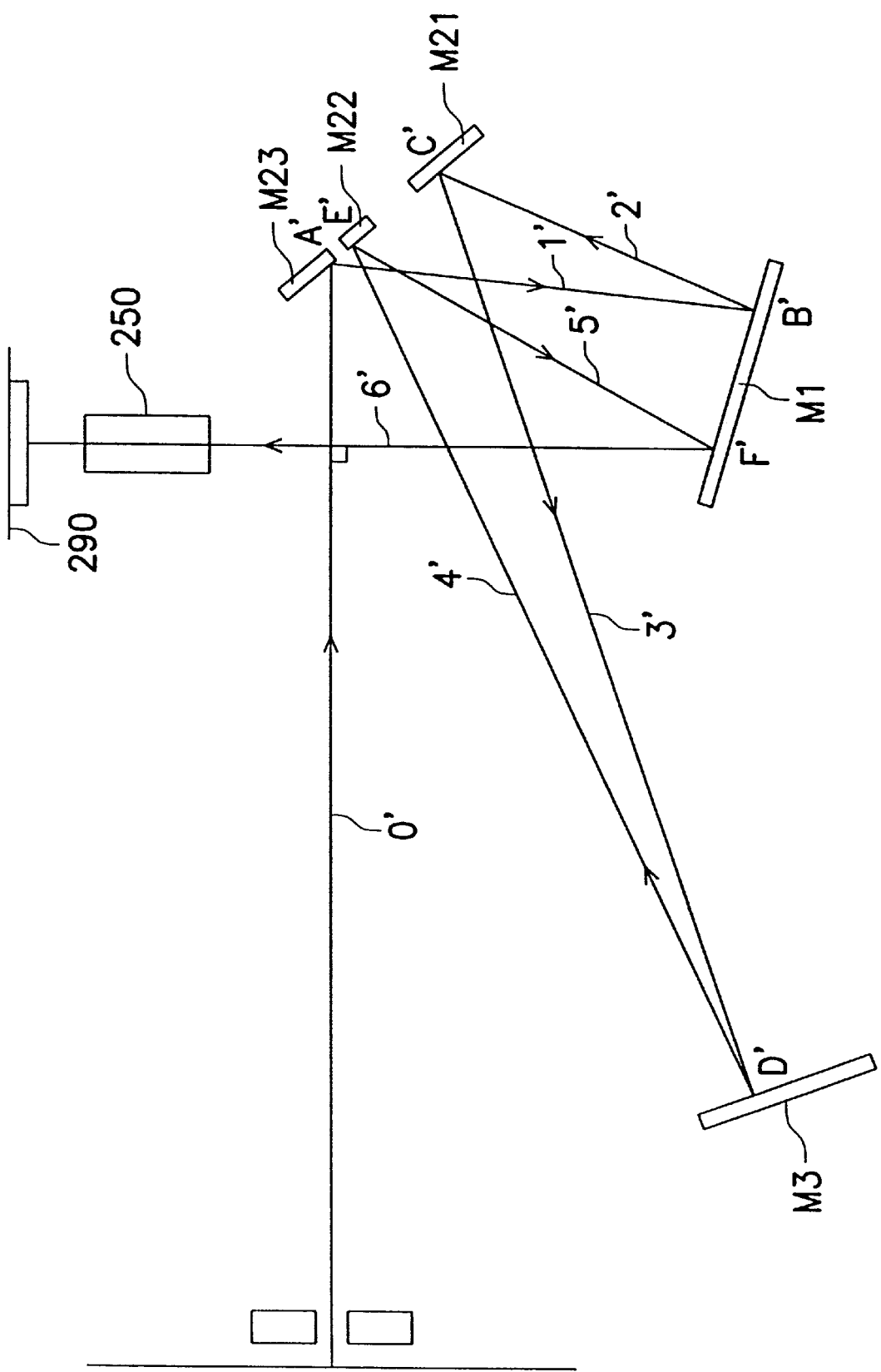
Figure 8G:
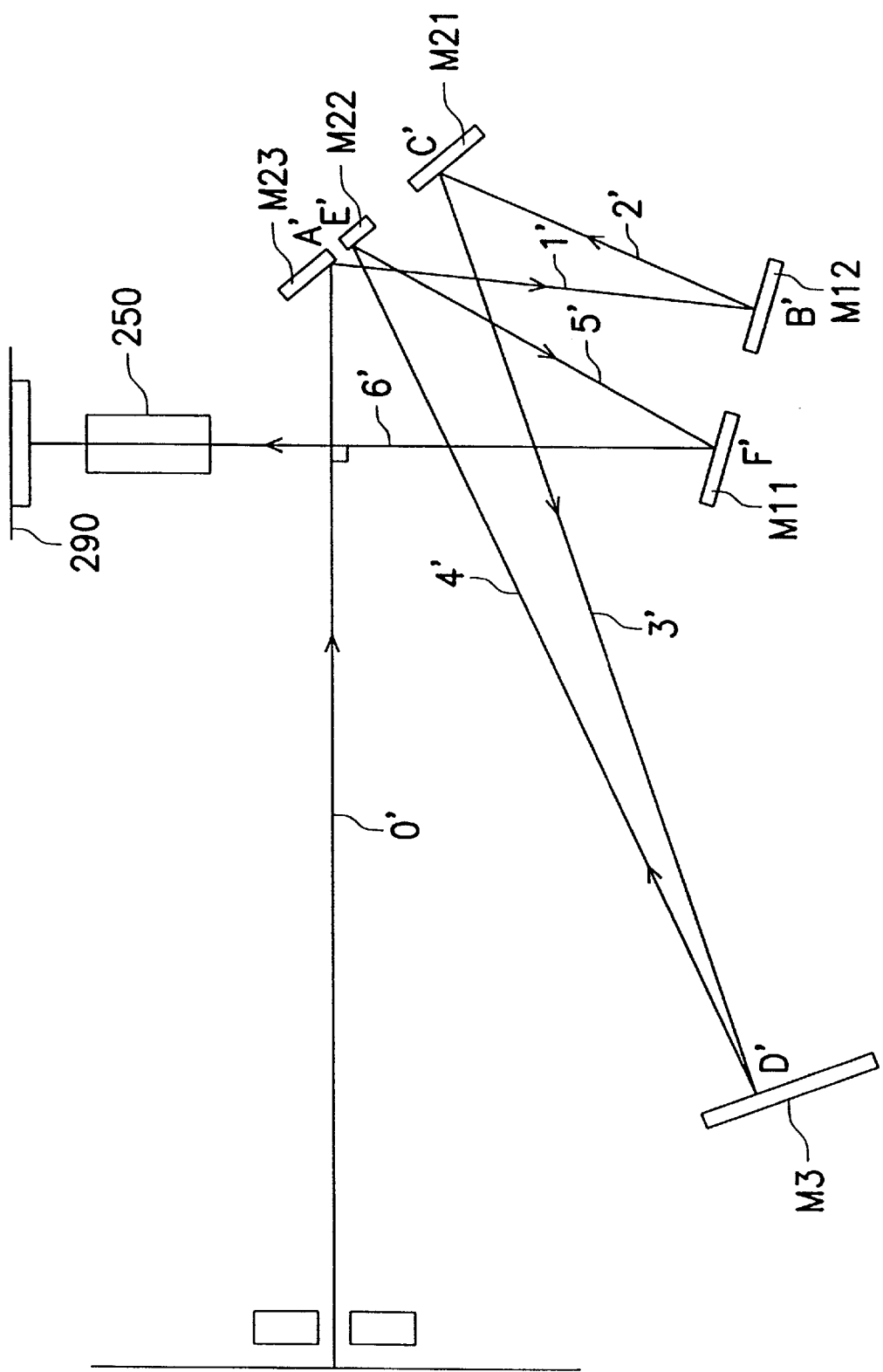

In the second embodiment of the present invention, the reverse optical path folding path is shown. As shown in FIG. 7, the reflecting sequence is →M2→M1→M2→M3→M2→M1→the lens set. The first mirror M1 has two coplanar reflection portions A' and E', wherein the light reflected at each portion is reflected at a different angle. The second mirror M2 has three coplanar reflection portions B', D' and E' at different positions, wherein the light reflected at each portion is reflected at a different angle. The third mirror M3 has one reflection portion C'. Thus, the light is reflected six times.

As shown in FIG. 7, a first portion A' of the second mirror M2 receives an incident light beam 0' and reflects a first light beam 1' to illuminate on a second portion B' of the first mirror M1. Next, the second portion B' of the first mirror M1 receives the first light beam 1' and reflects a second light beam 2' to illuminate on a third portion C' of the second mirror M2. Next, the third portion C' of the second mirror M2 receives the second light beam 2' and reflects a third light beam 3' to illuminate on a fourth portion D' of the third mirror M3. Next, the fourth portion D' of the third mirror M3 receives the third light beam 3' and reflects a fourth light beam 4' to illuminate on a fifth portion E' of the second mirror M2. Next, the fifth portion E' of the second mirror M2 receives the fourth light beam 4' and reflects a fifth light beam 5' to illuminate on a sixth portion F' of the first mirror M1. Finally, the sixth portion F' of the first mirror M1 receives the fifth light beam 5' and reflects a sixth light beam 6' leaving the optical path folding apparatus. In this embodiment, the incident light beam 0' is exactly perpendicular to the sixth light beam 6'.

As shown in FIGS. 8A to 8F, it is not necessary for the first portion A', the third portion C' and the fifth portion E' to be on the same mirror. Nor is it necessary for the second portion B' and the sixth portion F' to be on the same mirror. The mirrors may be divided into pieces as long as the portions originally located for reflecting light beam thereupon are still coplanar. That is, the first portion A', the third portion C' and the fifth portion E' should be coplanar, and the second portion B' and the sixth portion F' should be coplanar.

In the optical folding apparatus of the present invention, light is reflected six times. Thus, a relatively long optical path can be obtained even when the optical apparatus is disposed in a confined space. Applied to a scanner, for example, the optical folding apparatus of the present invention can be applied to reduce the space between mirrors (e.g., decrease the size of the optical folding apparatus) while maintaining the same the optical path length to obtain a compact scanner.

On the other hand, the optical folding apparatus of the present invention can be applied in a conventionally sized scanner to achieve a longer optical path. Thus, the present invention can be applied to reduce the spherical aberration and achieve superior quality of scanned images.

Furthermore, the fact that the second mirror M2 and the third mirror M3 are not parallel means the angle of reflection at successive reflection portions is not the same. Therefore, aberrant light rays outside the desired optical path will not reach the lens set and the image capturing device. Thus, the present invention eliminates ghost images, which are caused by most optical folding apparatus using parallel mirrors.

A CCD has been used as an example of an image capturing device in this description. In fact, any kind of image capturing device is appropriate for this invention. Moreover, this invention can be applied to any kinds of scanner, such as a flat-bed scanner, a feed-sheet scanner or a transmissive scanner.

In addition to applying the optical path folding apparatus to a scanner, the apparatus of the present invention can also apply to other equipment, such as a projector, a copy machine, or a telescope.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. An optical path folding apparatus, which is suitable for guiding an incident light to a lens set, comprising:

a first portion receiving the incident light and reflecting a first light beam;

a second portion receiving the first light beam and reflecting a second light beam;

a third portion receiving the second light beam and reflecting a third light beam;

a fourth portion receiving the third light beam and reflecting a fourth light beam;

a fifth portion receiving the fourth light beam and reflecting a fifth light beam; and a sixth portion receiving the fifth light beam and reflecting a sixth light beam to the lens set; wherein the first portion and the fifth portion are coplanar, and the second portion, the fourth portion and the sixth portion are coplanar, wherein the first portion and the fifth portion are located on a first mirror;

the second portion, the fourth portion and the sixth portion are located on a second mirror; and the third portion is located on a third mirror.

2. An optical path folding apparatus as claimed in claim 1, wherein the incident light is perpendicular to the sixth light beam.

3. A scanner comprising the optical path folding apparatus of claim 1.

4. An optical path folding apparatus, which is suitable for guiding an incident light to a lens set, comprising:

a first portion receiving the incident light and reflecting a first light beam;

a second portion receiving the first light beam and reflecting a second light beam;

a third portion receiving the second light beam and reflecting a third light beam;

a fourth portion receiving the third light beam and reflecting a fourth light beam;

a fifth portion receiving the fourth light beam and reflecting a fifth light beam; and a sixth portion receiving the fifth light beam and reflecting a sixth light beam to the lens set; wherein the first portion and the fifth portion are coplanar, the first portion and the third portion are not coplanar, and the second portion, the fourth portion and the sixth portion are coplanar.

5. An optical path folding apparatus as claimed in claim 4, wherein the incident light is perpendicular to the sixth light beam.

6. A scanner comprising the optical path folding apparatus of claim 4.

* * * * *